United States Patent
Develter et al.

(10) Patent No.: US 11,252,969 B2
(45) Date of Patent: Feb. 22, 2022

(54) BAKERY COMPOSITION

(71) Applicant: PURATOS NV, Groot-Bijgaarden (BE)

(72) Inventors: Bram Develter, Kampenhout (BE); Thierry Dauvrin, Couthuin (BE)

(73) Assignee: Puratos NV, Groot-Bijgaarden (BE)

( * ) Notice: Subject to any disclaimer, the term of this patent is extended or adjusted under 35 U.S.C. 154(b) by 0 days.

(21) Appl. No.: 16/312,711

(22) PCT Filed: Jul. 10, 2017

(86) PCT No.: PCT/EP2017/067212
§ 371 (c)(1),
(2) Date: Dec. 21, 2018

(87) PCT Pub. No.: WO2018/011118
PCT Pub. Date: Jan. 18, 2018

(65) Prior Publication Data
US 2019/0208795 A1 Jul. 11, 2019

(30) Foreign Application Priority Data

Jul. 11, 2016 (BE) .................................. 2016/5578

(51) Int. Cl.
| | | |
|---|---|---|
| *A21D 8/04* | (2006.01) | |
| *A21D 2/16* | (2006.01) | |
| *A21D 13/00* | (2017.01) | |
| *A21D 10/00* | (2006.01) | |

(52) U.S. Cl.
CPC ............... *A21D 8/042* (2013.01); *A21D 2/16* (2013.01); *A21D 10/005* (2013.01); *A21D 13/00* (2013.01); *C12Y 304/21111* (2013.01)

(58) Field of Classification Search
USPC ....................................................... 426/549
See application file for complete search history.

(56) References Cited

U.S. PATENT DOCUMENTS

| | | | | |
|---|---|---|---|---|
| 3,743,512 | A * | 7/1973 | Hansen | A21D 2/16 426/96 |
| 4,178,393 | A * | 12/1979 | Gregersen | A21D 2/16 426/653 |
| 2005/0255204 | A1* | 11/2005 | Arnaut | A21D 8/042 426/321 |
| 2008/0233240 | A1* | 9/2008 | Wegman | A21D 2/145 426/61 |
| 2011/0097440 | A1* | 4/2011 | Van Winckel | A21D 8/042 426/20 |

FOREIGN PATENT DOCUMENTS

| | | |
|---|---|---|
| EA | 011950 B1 | 12/2006 |
| EP | 0776604 A1 | 6/1997 |
| EP | 1350432 A1 | 10/2003 |
| EP | 1982597 A1 | 10/2008 |
| EP | 2123163 A1 | 11/2009 |
| RU | 2140740 C1 | 11/1999 |

OTHER PUBLICATIONS

Sep. 22, 2017, International Search Report and Written Opinion for International Patent Application No. PCT/EP2017/067212, 9 pages.
Jan. 15, 2019, International Preliminary Report on Patentability for International Patent Application No. PCT/EP2017/067212, 6 pages.
Russian Search Report for Russian Patent Application No. 2019102085/10, dated Nov. 10, 2020.

* cited by examiner

*Primary Examiner* — Lien T Tran
(74) *Attorney, Agent, or Firm* — Lathrop GPM LLP; James H. Velema; Judith L. Stone-Hulslander

(57) ABSTRACT

It has been found that the particular combination of a thermophilic serine protease and monoglycerides, are able to improve the short bite in bakery products. Provided herein are compositions comprising this particular combination of ingredients, the use of this particular combination of ingredients and methods for preparing bakery products using the combination of a thermophilic serine protease and monoglycerides.

21 Claims, 2 Drawing Sheets

BAKERY COMPOSITION

CROSS-REFERENCE TO RELATED APPLICATIONS

This application is a 35 U.S.C. § 371 filing of International Patent Application No. PCT/EP2017/067212, filed Jul. 10, 2017, which claims priority to Belgium Patent Application No. 2016/5578, filed Jul. 11, 2016, the entire contents of which are incorporated herein by reference.

FIELD OF THE INVENTION

The present invention relates to the improvement of the short bite of bakery products.

BACKGROUND OF THE INVENTION

When buying bakery products consumers take into account a series of parameters such as appearance, softness, moistness or aroma. The way the bakery product can be eaten is also imperative, the bakery product should for instance be easily bitten without having to chew it extensively, because this particular aspect is considered to be a characteristic of the freshness of the product. Consumers also prefer to buy breads with the lowest possible (labelled) additives.

During staling, the characteristics of a bakery product change. In particular, the aroma profile changes, the product becomes harder, dryer and it becomes more difficult to chew, and as a result the bakery product is considered to become "less fresh".

The short bite of a bakery product can be defined as the easiness to bite into or to tear off a piece of the bakery product. It is reflected by the force needed to break a sample and the number of chews to masticate a sample to a consistency ready for swallowing. In a way, the short bite is the opposite of the chewiness. Furthermore short bite is very different from softness. Indeed, softness of a bread is reflected by the force needed to compress a sample till a certain deformation. Softness is also the opposite of hardness. A bread can therefore be soft while having no short bite and vice versa.

Currently, there have already been some methods proposed to improve the short bite of a bakery product. EP0776604 describes the use of unsaturated monoglycerides to produce microwavable crispy bread-roll having short bite. WO2009138447 describes the use of an intermediate thermostable or thermostable serine or metallo-protease to improve the short bite of bakery products.

The use of an intermediate thermostable or a thermostable serine or metallo-protease improves the short bite of bakery products to a certain extent, but this improvement of short bite is somehow limited as high amounts of enzyme tend to be detrimental to other bakery product properties, such as the crumbliness and the resiliency. High amounts of monoglycerides are causing an important reduction of dough resiliency and therefore are also quite detrimental for bakery products. Furthermore they tend to give a metallic taste to bakery products at high doses.

There is therefore a need for new methods and products to further improve the short bite.

SUMMARY OF THE INVENTION

The inventors have found that the use of combination of a thermophilic serine protease having an optimum activity at a temperature higher than 70° C. and a sufficient amount of monoglycerides in bakery applications, and in particular in bread making, has a synergistic effect on short bite.

Accordingly, in a first aspect, the present invention relates to a composition comprising:
- at least one first enzyme, wherein said first enzyme is a thermophilic serine protease having an optimum activity at a temperature higher than 70° C., preferably at a temperature higher than 80° C.; and;
- one or more monoglycerides, particularly wherein said one or more monoglycerides have an iodine value lower or equal to 5, preferably lower or equal to 2, and, when the composition is in powder form, wherein at least 70% of said monoglycerides have a particle size lower than 200 µm, preferably lower than 160 µm, more preferably lower than 120 µm.

In a particular embodiment the composition as disclosed herein provides that said first enzyme is a thermophilic serine protease wherein the ratio between the protease activity at optimum temperature and the protease activity at 25° C. is higher than 10, preferably higher than 15.

In a particular embodiment the composition as disclosed herein provides that said first enzyme is a neutral or an alkaline thermophilic serine protease.

In a particular embodiment the composition as disclosed herein provides that said first enzyme is a Taq protease, preferably isolated from *Thermus aquaticus*, preferably aqualysin I or aqualysin II, more preferably aqualysin I, even more preferably aqualysin I isolated from *Thermus aquaticus* LMG8924.

In a particular embodiment the composition as disclosed herein provides that said first enzyme is present in an amount of 100 to 1200 units/100 kg of flour, preferably at 200 to 900 units/100 kg of flour, more preferably at 350 to 700 units/100 kg of flour.

Accordingly, in a further aspect, the present invention relates to the use of a composition as disclosed herein in bakery applications.

In a particular embodiment the composition as disclosed herein is used in bread improvers.

In a particular embodiment the composition as disclosed herein is used in soft bakery products and crusty bakery products, preferably bread, soft rolls, donuts, buns, microwavable buns, Danish pastry, croissants, hamburger rolls, pizza and pita bread and cake.

Accordingly, in a further aspect, the present invention relates to a bread improver comprising the composition as disclosed herein.

Accordingly, in a further aspect, the present invention relates to a method for preparing a baked product, comprising the steps of adding to the dough or batter, prior to baking:
- at least one first enzyme, wherein said first enzyme is a thermophilic serine protease having an optimum activity at a temperature higher than 70° C., preferably at a temperature higher than 80° C.; and;
- one or more monoglycerides, particularly wherein said monoglycerides are added in powder form and wherein at least 70% of said powder is made of particles with a size lower than 200 µm, preferably lower than 160 µm, even more preferably lower than 120 µm and wherein said monoglycerides have an iodine value lower or equal to 5, preferably lower or equal to 2.

In a particular embodiment the method as disclosed herein provides that said baked product shows improved short bite, preferably wherein the maximum force needed to break a baked product, prepared using at least one first enzyme being a thermophilic serine protease having an optimum activity at a temperature higher than 70° C., preferably at a temperature higher than 80° C., and using one or more monoglycerides; is reduced with at least 15% compared to a reference baked product prepared using none of said first enzyme and said monoglycerides.

In a particular embodiment the method as disclosed herein provides that no adverse effects on dough rheology, on the crumb structure and on the volume of the resulting bakery product are observed.

Accordingly, in a further aspect, the present invention relates to a baked product prepared from a dough or batter comprising the composition as disclosed herein.

BRIEF DESCRIPTION OF THE FIGURES

FIG. 1A represents a texture analyser equipped with a pizza tensile rig (2 probes with pins. FIG. 1B represents the actual measurement setup, wherein a bun is attached to the pizza tensile rig and wherein the upper probe is moved up at a constant speed until the bun breaks. FIG. 1C shows a typical graph of the measurement wherein the needed force expressed in gram (g) is measured in function of time (s).

DESCRIPTION

Figure 1A:
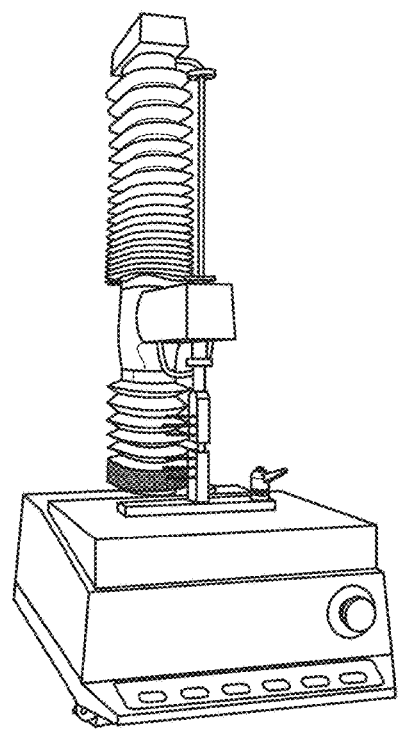
FIGS. 1A-1C represent different aspects of the evaluation of the short bite with the aid of a texture analyser.

Before the present products, compositions, uses and methods of the invention are described, it is to be understood that this invention is not limited to particular products, compositions, uses and methods or combinations described, since such products, compositions, uses and methods and combinations may, of course, vary. It is also to be understood that the terminology used herein is not intended to be limiting, since the scope of the present invention will be limited only by the appended claims.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

The recitation of numerical ranges by endpoints includes all numbers and fractions subsumed within the respective ranges, as well as the recited endpoints.

The term "about" or "approximately" as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to perform the disclosed invention. It is to be understood that the value to which the modifier "about" or "approximately" refers is itself also specifically, and preferably, disclosed.

Whereas the terms "one or more" or "at least one", such as one or more or at least one member(s) of a group of members, is clear per se, by means of further exemplification, the term encompasses inter alia a reference to any one of said members, or to any two or more of said members, such as, e.g., any $\geq 3$, $\geq 4$, $\geq 5$, $\geq 6$ or $\geq 7$ etc. of said members, and up to all said members.

All references cited in the present specification are hereby incorporated by reference in their entirety. In particular, the teachings of all references herein specifically referred to are incorporated by reference.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

In the following passages, different aspects and embodiments of the invention are defined in more detail. Each aspect and embodiment so defined may be combined with any other aspect or aspects and embodiment or embodiments unless clearly indicated to the contrary. In particular, any feature indicated as being preferred or advantageous may be combined with any other feature or features indicated as being preferred or advantageous.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the appended claims, any of the claimed embodiments can be used in any combination.

The inventors have surprisingly found that by using a new combination of ingredients, in particular the combination of a thermophilic serine protease and one or more monoglycerides, it was possible to obtain an improvement of the short bite that was by far more significant compared to the short bite expected for the addition of the effects of the individual ingredients used alone.

Short bite, also sometimes referred to as opposite to chewiness and/or to toughness, is used to designate the force needed to break a sample of a bakery product and/or the number of chews needed to masticate a bakery product sample until a consistency that makes it ready to swallow. Short bite can be easily measured by a trained taste panel of people and can be reasonably quantified using an arbitrary short bite scale. Such techniques are well known in the food industry and are generally referred to as organoleptic testing. In such a method, an initial training session is organized to familiarize the panellists with the range of products that will be tested. In this session, reference standards are presented to train the panellists to recognize the differences between the product attributes that are to be measured. In a second step, the panellists receive a number or products they have to score on short bite, on a scale from 0 to 10.

Figure 1B:
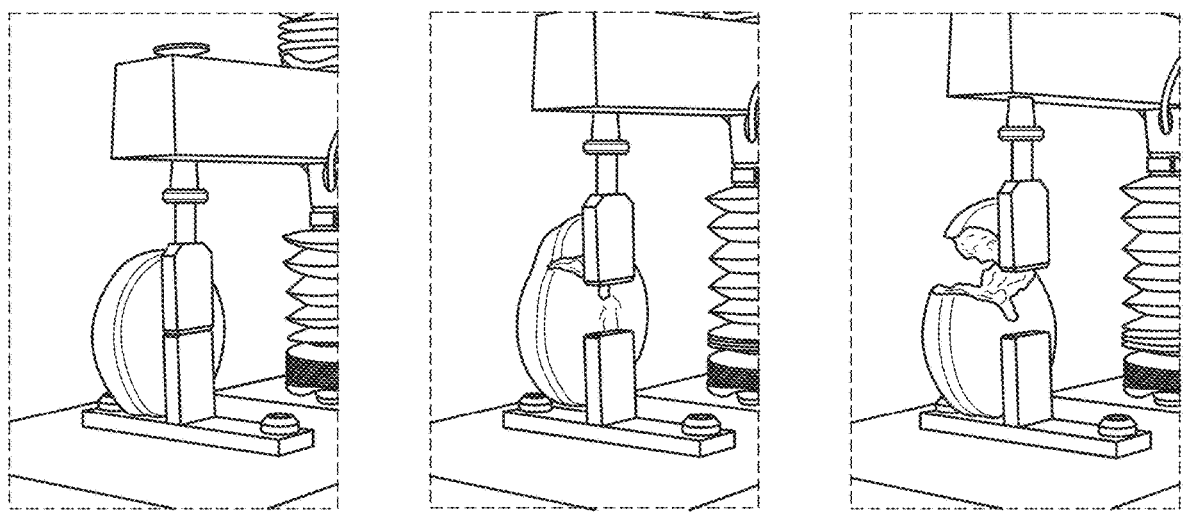
Figure 1C:
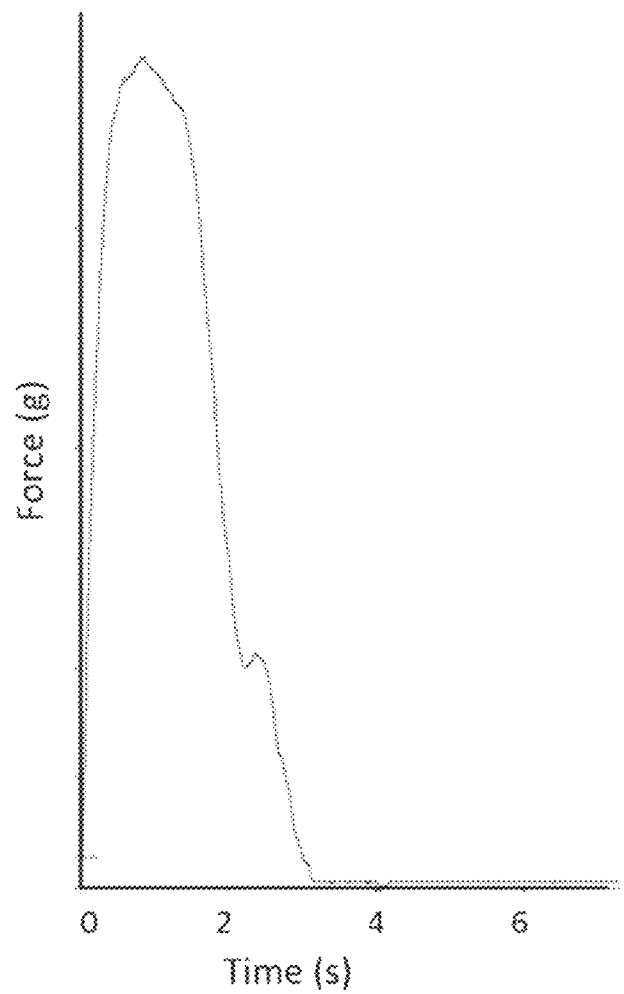

Short bite may also be evaluated with the aid of a texture analyser, as depicted in FIG. 1. In such a method, a bun is attached to a pizza tensile rig (2 probes with pins (see FIG. 1A)). The upper probe will move up at a constant speed and in this way break the bun (see FIG. 1B). The needed force expressed in gram (g) is measured by the texture analyser. Throughout this process, the required force will increase until the bun breaks and the force decreases. A typical graph of this measurement in shown in FIG. 1C. The maximum force ($F_{max}$) measured is a common parameter for evaluating short bite.

The inventors have surprisingly found that the simultaneous use of a sufficient amount of a thermophilic serine protease and a sufficient amount of monoglycerides in a dough before baking shows an unexpected synergistic effect on the improvement of the short bite in the baked product. Particularly, said monoglycerides are added in powder form and at least 70% of said powder is made of particles with a size lower than 200 µm, preferably lower than 160 µm, even more preferably lower than 120 µm and wherein said monoglycerides have an iodine value lower or equal to 5, preferably lower or equal to 2.

Indeed, the short bite given by the combination of the thermophilic serine protease and the monoglycerides is bigger than the sum of the effects of the thermophilic serine protease and the monoglycerides taken individually. There is a synergy when the effect given by amount x of the thermophilic serine protease combined with amount y of monoglycerides is bigger than the sum of the effect given by amount x of the thermophilic serine protease and the effect given by the amount y of monoglycerides.

Accordingly, in a first aspect, the present invention relates to a composition comprising:
  at least one first enzyme, wherein said first enzyme is a thermophilic serine protease; and;
  one or more monoglycerides. Particularly, said one or more monoglycerides are fully hydrogenated with an iodine value below 5, preferably below 2.5, more preferably lower or equal to 2 and, when the composition is in powder form, wherein at least 70% of the one or more monoglycerides have a particle size lower than 200 µm, preferably lower than 160 µm, more preferably lower than 120 µm.

In a particular embodiment, said first enzyme is a thermophilic serine protease having an optimum activity at a temperature higher than 70° C., preferably at a temperature higher than 75° C. and more preferably at a temperature higher than 80° C.

It has further been found that the synergistic effect that is referred to herein is particularly present when the thermophilic serine protease as referred to herein has an optimum activity at a temperature higher than 70° C., preferably at a temperature higher than 75° C. and more preferably at a temperature higher than 80° C.

As used herein, the term "protease" refers generally to enzymes (also referred to as peptidases or proteinases) that hydrolyse the peptide bonds that link amino acids together in a polypeptide chain preferably as defined by enzyme entry EC 3.4. They are classified in several classes according to their catalytic residues. Among these classes, serine proteases (or serine endopeptidases) are proteases that cleave peptide bonds in proteins, in which serine serves as the nucleophilic amino acid at the active site. Serine proteases are defined by enzyme entry EC 3.4.21. Serine proteases may be further sub classified according to their substrate specificity as trypsin-like, chymotrypsin-like, thrombin-like, elastase-like or subtilisin like.

In the context of the present invention the protease activity is measured using azurine crosslinked casein (AZCL-casein) as a substrate. Hydrolysis by proteases produces water soluble dyed fragments, and the rate of release of these (e.g. increase in absorbance at 590 nm) can be related directly to enzyme activity (Protazyme AK Tablets, Megazyme, Ireland). More details on the protease activity measurement are given in the examples. The protease activity can also be measured with other assays for protease activity known by persons skilled in the art. Among these is the calorimetric method using casein as substrate followed by the detection of the released amino acids with the Folin & Ciocalteu's Phenol reagent.

As used herein, the term "thermophilic" and in particular "thermophilic protease" as used herein, refers to proteases active at elevated temperatures. In particular the thermophilic protease(s) has an activity optimum at a temperature higher than 70° C., preferably at a temperature higher than 75° C. and more preferably at a temperature higher than 80° C.

As used herein, the term "monoglycerides" refers generally to a class of glycerides which are composed of a molecule of glycerol linked to a fatty acid via an ester bond. Monoglycerides are one of the many types of emulsifiers used in bakery applications: among these are monoglycerides (or mixtures of monoglycerides and diglycerides; referred as E471 by the International Numbering System for Food Additives (INS) or as 184.1505 by the US Food and Drug Agency), monoglycerides derivatives (as for example succinylated lactylated or acetylated monoglycerides, diacetyl tartaric acid esters of monoglycerides (DATEM), glycerol monostearate (GMS), propylene glycol monoester, . . . ), sorbitan emulsifiers (sorbitan monostarate), polysorbates, sodium stearoyl lactylate (SSL), polyglycerol esters, sucrose esters and lecithin.

In a particular embodiment the composition as disclosed herein provides that said first enzyme is a thermophilic serine protease wherein the ratio between the protease activity at optimum temperature and the protease activity at 25° C. is higher than 10, preferably higher than 15. By providing that said ratio is higher than 10, the thermophilic serine protease as used herein provides that improved effects on short bite are obtained.

In a particular embodiment the composition as disclosed herein provides that said first enzyme is obtained by extraction from naturally-occurring eukaryotic or prokaryotic organisms, by synthesis or by genetic engineering. In a particular embodiment the composition as disclosed herein provides that said first enzyme is a neutral or an alkaline thermophilic serine protease. While fungal proteases are sensitive to high temperatures, bacterial neutral and alkaline proteases are more resistant to higher heat treatments.

In a particular embodiment the composition as disclosed herein provides that said first enzyme is a Taq protease, preferably isolated from *Thermus aquaticus*, preferably aqualysin I or aqualysin II, more preferably aqualysin I, and even more preferably aqualysin I isolated from *Thermus aquaticus* LMG8924.

In a particular embodiment the composition as disclosed herein provides that said first enzyme, preferably aqualysin I, is present in an amount of 100 to 1200 units/100 kg of flour, preferably at 200 to 900 units/100 kg of flour, more preferably at 350 to 700 units/100 kg of flour. Aqualysin I is advantageously added to the dough/batter at 100 to 1200 units/100 kg of flour, preferably at 200 to 900 units/100 kg of flour, more preferably at 350 to 700 units/100 kg of flour, the enzyme activity being obtained using the method described herein.

In the composition as disclosed, herein the monoglycerides (E471) are any type of monoglycerides. Particularly, the one or more monoglycerides as referred to herein are fully hydrogenated with an iodine value below 5, preferably below 2.5, more preferably lower or equal to 2 and, when the composition is in powder form, at least 70% of the monoglycerides have a particle size lower than 200 µm, preferably lower than 160 µm, more preferably lower than 120 µm. It has been found that the synergistic effect that is referred to herein is particularly present with monoglycerides as referred to herein having these iodine value and particle size as defined above.

In the context of the present invention the iodine value is advantageously determined using an assay derived from the method of Wijs-Hoffmann-Green as described herein.

In the context of the present invention the particle size is advantageously determined by laser diffraction method as described herein.

Monoglycerides are advantageously added to the dough in a concentration between 100 and 2000 g/100 kg of flour, preferably between 200 and 1500 g/100 kg of flour, more preferably between 400 and 1200 g/100 kg of flour.

In a particular embodiment the composition comprises between 0.29 units and 1.87 units of said first enzyme, preferably aqualysin I/g of monoglycerides.

In a particular embodiment the composition as disclosed herein is a bread improver, a patisserie mix or a patisserie premix, preferably a bread improver.

"Bread improvers" (also referred to as "dough conditioners", "dough improvers" or "improving agent" or "flour treatment agent") are typically added to the dough during baking in order to improve texture, volume, flavour and freshness of the baked product as well as to improve machinability and stability of the dough. Typically, a bread improver comprises or consists of: one or more enzymes (such as e.g. amylases, xylanases, phospholipases, oxidases, lipases, lipoxygenases, dehydrogenases and laccases), one or more oxidizing or reducing agents (such as e.g. ascorbic acid, glutathione, cysteine), one or more emulsifiers (such as e.g. monoglycerides derivatives (as for example succinylated lactylated or acetylated monoglycerides, diacetyl tartaric acid esters of monoglycerides (DATEM), glycerol monostearate (GMS), propylene glycol monoester, . . . ), sorbitan emulsifiers (sorbitan monostarate), polysorbates, sodium stearoyl lactylate (SSL), polyglycerol esters, sucrose esters and lecithin), one or more lipid materials (such as e.g. margarine, butter, oil, shortening), one or more vitamins (such as e.g. pantothenic acid and vitamin E), one or more gums, and/or one or more sources of fibre (such as e.g. oat fibre). Patisserie mixes typically comprise all the ingredients of a patisserie product recipe with the exception of water, fat (oil, butter, margarine) and eggs. Patisserie premixes are typically patisserie mixes where all or part of the flour and sugar has been removed.

In a particular embodiment the composition as disclosed herein is a dough or batter comprising flour and at least one first enzyme, wherein said first enzyme is a thermophilic serine protease preferably having an optimum activity at a temperature higher than 70° C., preferably at a temperature higher than 75° C. and more preferably at a temperature higher than 80° C.; and; one or more monoglycerides as referred to herein.

In a further embodiment the composition as disclosed herein may further comprise appropriate amounts of one or more enzymes (such as e.g. amylases, xylanases, phospholipases, lipases, oxidases, lipoxygenases, dehydrogenases and laccases), one or more oxidizing or reducing agents (such as e.g. ascorbic acid, glutathione, cysteine), one or more emulsifiers (such as e.g. monoglycerides derivatives (as for example succinylated lactylated or acetylated monoglycerides, diacetyl tartaric acid esters of monoglycerides (DATEM), glycerol monostearate (GMS), propylene glycol monoester, . . . ), sorbitan emulsifiers (sorbitan monostarate), polysorbates, sodium stearoyl lactylate (SSL), polyglycerol esters, sucrose esters and lecithin), one or more lipid materials (such as e.g. margarine, butter, oil, shortening), one or more vitamins (such as e.g. pantothenic acid and vitamin E), one or more gums, and/or one or more sources of fibre (such as e.g. oat fibre).

In a further embodiment the composition as disclosed herein comprises:
- at least one first enzyme, wherein said first enzyme is a thermophilic serine protease preferably having an optimum activity at a temperature higher than 70° C., preferably at a temperature higher than 75° C. and more preferably at a temperature higher than 80° C.;
- one or more monoglycerides as referred to herein; and;
- at least one second enzyme, wherein said second enzyme is a lipase.

As used herein, the term "lipase" refers generally to triacylglycerol lipases or triacylglycerol acylhydrolase as defined by enzyme entry EC 3.1.1.3. Lipases are defined herein as enzymes that catalyze the hydrolysis of triacylglycerols to give free fatty acids, diacylglycerols, monoacylglycerols and glycerol. The lipase used in the compositions defined herein may comprise enzymatic side-activities such as for example phospholipase activity.

In a particular embodiment the composition as disclosed herein provides that said second enzyme is a triacylglycerol lipase or triacylglycerol acylhydrolase as defined by enzyme entry EC 3.1.1.3, preferably selected from lipases obtained from *Thermomyces lanuginosus, Rhizopus oryzae* and *Rhizomucor miehei*.

Furthermore, in a further aspect, the present invention relates to the use of a composition as disclosed herein in bakery applications. In the context of the present invention, bakery applications refer to applications related to both bread and patisserie products. In particular said bakery products are soft bakery products and/or crusty bakery products, preferably bread, soft rolls, donuts, buns, microwavable buns, Danish pastry, croissants, hamburger rolls, pizza and pita bread and cake.

In a particular embodiment the use of the composition as disclosed herein in bread improvers, in patisserie mixes or in patisserie premixes is provided.

It is therefore an object of the present invention to provide in the use of the compositions according to the present invention to improve the short bite of bakery products which comprise the step of adding to the dough before baking a sufficient amount of one or more thermophilic serine protease(s) and a sufficient amount of one or more monoglycerides as referred to herein.

In a particular embodiment the composition as disclosed herein is used for the improvement of short bite in baked products.

In a further aspect, disclosed herein is a method for preparing a baked product, comprising the steps of adding to the dough or batter, prior to baking:
- at least one first enzyme, wherein said first enzyme is a thermophilic serine protease; and;
- one or more monoglycerides; particularly, wherein said one or more monoglycerides have an iodine value below 5, preferably below 2, and, when the composition is in powder form, wherein at least 70% of the one or more monoglycerides have a particle size lower than 200 µm, preferably lower than 160 µm, more preferably lower than 120 µm.

In a particular embodiment, said first enzyme is a thermophilic serine protease having an optimum activity at a temperature higher than 70° C., preferably at a temperature higher than 75° C. and preferably at a temperature higher than 80° C.

In the context of the present invention the protease activity is measured using azurine crosslinked casein (AZCL-casein) as a substrate. Hydrolysis by proteases produces water soluble dyed fragments, and the rate of release of these (e.g. increase in absorbance at 590 nm) can be related directly to enzyme activity (Protazyme AK Tablets, Megazyme, Ireland). More details on the protease activity measurement are given in the examples. The protease activity can also be measured with other assays for protease activity known by persons skilled in the art. Among these is the calorimetric method using casein as substrate followed by the detection of the released amino acids with the Folin & Ciocalteu's Phenol reagent.

In a particular embodiment, the method as disclosed herein provides that said first enzyme is a thermophilic serine protease wherein the ratio between the protease activity at optimum temperature and the protease activity at 25° C. is higher than 10, preferably higher than 15. By providing that said ratio is higher than 10, the thermophilic serine protease as used herein provides that improved effects on short bite are obtained.

In a particular embodiment the method as disclosed herein provides that said first enzyme is obtained by extraction from naturally-occurring eukaryotic or prokaryotic organisms, by synthesis or by genetic engineering. In a particular embodiment the composition as disclosed herein provides that said first enzyme is a neutral or an alkaline thermophilic serine protease.

In a particular embodiment the method as disclosed herein provides that said first enzyme is a Taq protease, preferably isolated from *Thermus aquaticus*, preferably aqualysin I or aqualysin II, more preferably aqualysin I, and even more preferably aqualysin I isolated from *Thermus aquaticus* LMG8924.

In a particular embodiment in the method as disclosed herein said first enzyme, preferably aqualysin I, is added to the dough or batter in an amount of 100 to 1200 units/100 kg of flour, preferably at 200 to 900 units/100 kg of flour, more preferably at 350 to 700 units/100 kg of flour. Aqualysin I is advantageously added to the dough/batter at 100 to 1200 units/100 kg of flour, preferably at 200 to 900 units/100 kg of flour, more preferably at 350 to 700 units/100 kg of flour, the enzyme activity being obtained using the method described herein.

In a particular embodiment of the method as disclosed herein appropriate amounts of enzymes and monoglycerides may be added directly to the dough or the batter during its preparation or before mixing of the ingredients. In other embodiments the enzymes and the monoglycerides may be added as part of an (bread) improver, a patisserie mix or premix, preferably as part of a bread improver. In particular the enzymes and the monoglycerides or the bread improver are added before proofing.

In the method as disclosed herein the monoglycerides (E471) are any type of monoglycerides. Particularly, said monoglycerides are fully hydrogenated with an iodine value below 5, preferably below 2.5, more preferably lower or equal to 2 and, when the composition is in powder form, at least 70% of the monoglycerides have a particle size lower than 200 µm, preferably lower than 160 µm, more preferably lower than 120 µm.

In a particular embodiment of the method as disclosed herein said monoglycerides are added in powder form and wherein at least 70% of said powder is made of particles with a size lower than 200 µm, preferably lower than 160 µm, even more preferably lower than 120 µm, and wherein said monoglycerides have an iodine value below 5, preferably below 2.5, more preferably lower or equal to 2.

In a particular embodiment is disclosed herein is a method for preparing a baked product, comprising the steps of adding to the dough or batter, prior to baking:
  at least one first enzyme, wherein said first enzyme is a thermophilic serine protease preferably having an optimum activity at a temperature higher than 70° C., preferably at a temperature higher than 75° C. and more preferably at a temperature higher than 80° C.;
  one or more monoglycerides, particularly, wherein said one or more monoglycerides have an iodine value below 5, preferably below 2, and, when the composition is in powder form, wherein at least 70% of the one or more monoglycerides have a particle size lower than 200 µm, preferably lower than 160 µm, more preferably lower than 120 µm; and
  at least one second enzyme, wherein said second enzyme is a lipase.

In a particular embodiment the method as disclosed herein provides that said baked product shows improved short bite, preferably wherein the maximum force needed to break a baked product, prepared using at least one first enzyme being a thermophilic serine protease having an optimum activity at a temperature higher than 70° C., preferably at a temperature higher than 75° C. and preferably at a temperature higher than 80° C., and using at least one monoglyceride as referred to herein; is reduced with at least 15% compared to a reference baked product prepared using none of said first enzyme or at least one monoglyceride as referred to herein. In particular embodiments the maximum force needed to break a baked product using said first enzyme and at least one monoglyceride as referred to herein is reduced with at least 20% compared to a reference baked product prepared using none of said first enzyme or at least one monoglyceride as referred to herein. In particular embodiments the maximum force needed to break a baked product using said first enzyme and said one or more monoglycerides as referred to herein is reduced with at least 25% compared to a reference baked product prepared using none of said first enzyme or at least one monoglyceride, particularly at least one monoglyceride having a iodine value greater than 5 or wherein less than 70% of said one or more monoglyceride have a particle size lower than 200 µm or 160 µm.

In a particular embodiment the method as disclosed herein provides that said baked product shows improved short bite, preferably wherein the maximum force needed to break a baked product, prepared using at least one first enzyme being a thermophilic serine protease having an optimum activity at a temperature higher than 70° C., preferably at a temperature higher than 75° C. and preferably at a temperature higher than 80° C., and using at least one monoglyceride as referred to herein; is reduced with at least 10% compared to a reference baked product prepared using either said first enzyme or said at least one monoglyceride as referred to herein. In particular embodiments the maximum force needed to break a baked product using said first enzyme and said at least one monoglyceride as referred to herein is reduced with at least 15% compared to a reference baked product prepared using either said first enzyme or said at least one monoglyceride as referred to herein. This shows that the combination of said first enzyme and one or more monoglycerides as referred to herein provides in a synergistic action which provides in a better than expected improved short bite. In particular embodiments the short bite is measured the day after baking.

In a particular embodiment the method as disclosed herein provides that no adverse effects on dough rheology, on the crumb structure and on the volume of the resulting bakery product are observed.

Furthermore, in a further aspect, the present invention relates to a baked product prepared from a dough or batter comprising the composition as disclosed herein.

In the context of the present invention a baked product is a bakery or patisserie product known in the art, such as for instance those selected from the group comprising bread, soft rolls, bagels, donuts, Danish pastry, hamburger rolls, pizza, pita bread, ciabatta, sponge cakes, cream cakes, pound cakes, muffins, cupcakes, steamed cakes, waffles, brownies, cake donuts, yeast raised donuts, baguettes, rolls, crackers, biscuits, cookies, pie crusts, rusks and other baked products. More preferably the present invention refers to bread, baguettes and rolls. In particular said baked product is a soft bakery products and crusty bakery products, preferably bread, soft rolls, donuts, buns, microwavable buns, Danish pastry, croissants, hamburger rolls, pizza and pita bread and cake.

EXAMPLES

Example 1: Methods

Enzyme Activities Determination

The protease activity is measured on azurine crosslinked casein (AZCL-casein). It is prepared by dyeing and cross-linking casein to produce a material which hydrates in water but is water-insoluble. Hydrolysis by proteases produces water soluble dyed fragments, and the rate of release of these (increase in absorbance at 590 nm) can be related directly to enzyme activity (Protazyme AK Tablets, Megazyme, Ireland). A protazyme AK tablet is incubated in 100 mM $Na_2HPO_4.2H_2O$; pH 7.0 at 60° C. for 5 min. An aliquot of enzyme (1.0 ml) is added and the reaction is allowed to continue for exactly 10 min. The reaction is terminated by the addition of tri-sodium phosphate (10 ml, 2% w/v, pH 12.3). The tube stands for approx. 2 min at room temperature and the content is filtered. The absorbance of the filtrate is measured at 590 nm against a substrate blank.

The activity is expressed as:

mU (milli Units)/ml (34.2*(Abs590 enzyme−Abs590 blank)+0.6)/dilution. One unit corresponds to 1000 mU.

Monoglycerides Iodine Value Determination

The method is based on the official methods AOCS Cd 1-25 and AOAC 981.11 with some modifications.

A sample of about 1 g is weighed and melted at max.10° C. above the melting point of the fat. 15 ml of Carbon tetrachloride CCl4 and 15 ml of Diethyl ether are added.

A blank sample is prepared with the reagents but without the sample.

25.0 ml of Wijs solution is added to the sample in a flask, followed by shaking. The flasks are put in a dark environment during 1 hour. After this, 3 g of potassium iodide and 150 ml of water are added. The solution is then titrated with continuous shaking with a 0.1N sodium thiosulfate solution to a light yellow colour. Starch indicator (soluble starch) is added and the titration is continued to the disappearance of the blue colour.

The Iodine value expressed in g $I_2$/100 g of product is equal to ((B−T)/P)*1.269 where B is the amount of ml sodium thiosulfate for the blank

T is the amount of ml sodium thiosulfate for the sample
P is the weight of the sample in g
1.269 is the molecular weight of iodine/100

Monoglycerides Particle Size Determination

The particle size is measured with a Lazer Diffractor LS 200 (Beckman Coulter) using the recommendations of the supplier.

Example 2: Soft Buns Prepared with Multec Mono 9402 sfp and *Thermus aquaticus* Taq1 Protease Soft buns were prepared using the dough compositions of Table 1. The protease and the monoglycerides used were the following:

Multec Mono 9402 sfp: distilled monoglycerides made from edible vegetable oil; iodine value (as I2) between 0 and 2 g/100 g; particle size: 70-100%<150 μm (Puratos NV; Belgium)

TaProt: *Thermus aquaticus* Taq1 protease. (aqualysine 1) as described in WO2009138447A1. The enzyme has an optimum of temperature activity of 80° C.

TABLE 1

| Ingredients (grams) | REF | P | $M^A$ | $2M^A$ | $4M^A$ | $PM^A$ | $P2M^A$ | $P4M^A$ |
|---|---|---|---|---|---|---|---|---|
| Wheat Flour (Duo; Ceres; Belgium)) | 2000 | 2000 | 2000 | 2000 | 2000 | 2000 | 2000 | 2000 |
| Water | 1100 | 1100 | 1100 | 1100 | 1100 | 1100 | 1100 | 1100 |
| Fresh Yeast (Bruggeman, Belgium) | 60 | 60 | 60 | 60 | 60 | 60 | 60 | 60 |
| Sodium Chloride | 40 | 40 | 40 | 40 | 40 | 40 | 40 | 40 |
| Margarine Aristo pan (Puratos, Belgium) | 60 | 60 | 60 | 60 | 60 | 60 | 60 | 60 |
| Sugar (sucrose) | 20 | 20 | 20 | 20 | 20 | 20 | 20 | 20 |
| Calcium propionate | 4 | 4 | 4 | 4 | 4 | 4 | 4 | 4 |
| Bread improver* | 40 | 40 | 40 | 40 | 40 | 40 | 40 | 40 |
| Multec Mono 9402 sfp | | | 5 | 10 | 20 | 5 | 10 | 20 |
| TaProt (units) | | 7 | | | | 7 | 7 | 7 |

*contains flour, mono-and diacetyl tartaric acid esters of mono- and diglycerides of fatty acids (E472e), dextrose, ascorbic acid, enzymes (alpha amylase, xylanase)

The ingredients are mixed for 2 min at low and 6 min at high speed in a spiral mixer type Diosna (SP24). The final dough temperature is 27° C. After a bulk proof of 5 min, a 1500 g dough is rounded and proofed during 10 min at bakery temperature (25° C.) and humidity (50-55%). 50 g dough pieces are made up using a Eberhardt moulder. These dough pieces are proofed at 35° C. for 85 min at 95% relative humidity in a Koma proofbox. The buns are then baked at 250° C. during 9 min in a Miwe Condo deck oven without steam. It is obvious to one skilled in the art that same end results can be obtained by using equipment of other suppliers.

The short bite of the buns was evaluated with a TA-XT2™ texture analyser equipped with a pizza tensile rig used at a speed of 20 mm/sec. This allows the measurement of the force (maximum force needed to break the bun expressed in grams (g)). As factors such as batch of flour, ambient temperature and humidity, and time between baking and test may affect said parameters, measures are compared to a reference using the same ingredients, baked and tested in parallel. For every test, 10 buns are evaluated. The standard deviation of the measurement (after removal of the outliers) was 21. The confidence interval was calculated by multiplying the standard deviation with the Student's law coefficient obtained by using an α-risk value of 5% and a number of degrees of liberty equal to 5. The confidence interval was 55.

Two ingredients act synergistically if the effect of the simultaneous use of the two ingredients is bigger than the sum of the effects of the ingredients taken individually, taking into account a 95% confidence interval. In other words, there is a synergy when the effect of (x g ingredient A+y g ingredient B) is bigger than the sum of the effect of x g ingredient A and the effect of y g ingredient B.

The results of the short bite measurements with the TA-XT2™ texture analyser are listed in table 2.

TABLE 2

|  | REF | P | $M^A$ | $2M^A$ | $4M^A$ | $PM^A$ | $P2M^A$ | $P4M^A$ |
|---|---|---|---|---|---|---|---|---|
| Force Max (g) | 921 | 882 | 881 | 863 | 812 | 769 | 751 | 653 |
| Actual reduction of force compared to REF | — | −39 | −40 | −58 | −109 | −152 | −170 | −268 |
| Theoretical reduction of force for combination | — | — | — | — | — | −79 | −97 | −148 |

The results show that the actual reduction of force obtained when a thermophilic serine protease and the monoglycerides are combined is lower than the lower limit of the confidence interval of the theoretical value (additive effect), demonstrating a synergistic effect on short bite.

The short bite of the buns was also evaluated by a trained panel of bakery experts. They were asked to mark the products according to a reference on a 0 to 10 points line scale with 0 being the low end (chewy) and 10 the high end (short). The standard deviation of the sensorial short bite measurement is 0.2. The confidence interval was calculated by multiplying the standard deviation with the Student's law coefficient using an α-risk value of 5% and a number of degrees of liberty equal to 5. The confidence interval was 0.64.

The results are listed in table 3.

TABLE 3

|  | REF | P | $M^A$ | $2M^A$ | $4M^A$ | $PM^A$ | $P2M^A$ | $P4M^A$ |
|---|---|---|---|---|---|---|---|---|
| Short bite | 4.5 | 5.0 | 5.0 | 5.5 | 6.3 | 6.5 | 7.3 | 7.8 |
| Actual increase of short bite compared to REF | — | +0.5 | +0.5 | +1.0 | +1.8 | +2.0 | +2.8 | +3.3 |
| Theoretical increase of short bite for combination | — | — | — | — | — | +1.0 | +1.5 | +2.3 |

The results show that the actual increase of short bite obtained when a thermophilic protease and the monoglycerides are combined is higher than the higher limit of the confidence interval of the theoretical value (additive effect), demonstrating a synergistic effect on short bite.

Example 3: Soft Buns Prepared with Multec Mono 9602 msp and *Thermus aquaticus* Taq1 Protease Soft buns were prepared according to the recipe and the process of example 2 using the enzyme combinations listed in Table 4. The ingredients used were the following:

Multec Mono 9602 msp: distilled monoglycerides made from edible vegetable oil; iodine value (as I2) between 0 and 2 g/100 g; particle size: 70-100%<100 μm (Puratos NV; Belgium);

TaProt as in example 1.

TABLE 4

|  | REF 2 | P | $M^B$ | $2M^B$ | $4M^B$ | $PM^B$ | $P2M^B$ | $P4M^B$ |
|---|---|---|---|---|---|---|---|---|
| TaProt (units) |  | 7 |  |  |  | 7 | 7 | 7 |
| Multec Mono 9602 sfp (g) |  |  | 5 | 10 | 20 | 5 | 10 | 20 |

Short bite of the buns was evaluated with the same methods as in example 1.

Results are presented in Table 5 (texture analysis) and table 6 (sensorial analysis)

TABLE 5

|  | REF 2 | P | $M^B$ | $2M^B$ | $4M^B$ | $PM^B$ | $P2M^B$ | $P4M^B$ |
|---|---|---|---|---|---|---|---|---|
| Force Max (g) | 828 | 780 | 824 | 769 | 645 | 647 | 636 | 566 |
| Actual reduction of force compared to REF 2 | — | −48 | −4 | −59 | −183 | −181 | −192 | −262 |
| Theoretical reduction of force for combination | — | — | — | — | — | −52 | −107 | −231 |

TABLE 6

|  | REF 2 | P | $M^B$ | $2M^B$ | $4M^B$ | $PM^B$ | $P2M^B$ | $P4M^B$ |
|---|---|---|---|---|---|---|---|---|
| Short bite (sensorial score) | 3.5 | 3.8 | 4.0 | 4.3 | 6.3 | 5.5 | 6.5 | 7.5 |
| Actual increase of short bite compared to REF 2 | — | +0.3 | +0.5 | +0.8 | +2.8 | +2.0 | +3.0 | +4.0 |
| Theoretical increase of short bite for combination | — | — | — | — | — | +0.8 | +1.1 | +3.1 |

Synergistic effect of the combination of a thermophilic serine protease and monoglycerides is observed.

Example 4: Soft Buns Prepared with Dimodan PH200 and *Thermus aquaticus* Taq1 Protease (Comparative Example)

Soft buns were prepared according to the recipe and the process of example 2 using the ingredients combinations listed in Table 7. The ingredients used were the following:
Dimodan PH200: distilled monoglycerides based on rapeseed oil; iodine value (as I2) approx. 15 g/100 g; particle size: 90%<200 μm, 70%<150 μm (DuPont Danisco);
TaProt as in example 1.

TABLE 7

|  | REF 3 | P | $M^C$ | $2M^C$ | $4M^C$ | $PM^C$ | $P2M^C$ | $P4M^C$ |
|---|---|---|---|---|---|---|---|---|
| TaProt (units) |  | 7 |  |  |  | 7 | 7 | 7 |
| Dimodan PH200 (g) |  |  | 5 | 10 | 20 | 5 | 10 | 20 |

Short bite of the buns was evaluated with the same methods as in example 1.

Results for texture analysis are presented in Table 8

TABLE 8

|  | REF 3 | P | $M^C$ | $2M^C$ | $4M^C$ | $PM^C$ | $P2M^C$ | $P4M^C$ |
|---|---|---|---|---|---|---|---|---|
| Force Max (g) | 841 | 625 | 754 | 664 | 678 | 588 | 634 | 579 |
| Actual reduction of force compared to REF 3 | — | −216 | −87 | −177 | −163 | −253 | −207 | −262 |
| Theoretical reduction of force for combination | — | — | — | — | — | −303 | −393 | −379 |

The results show that the actual reduction of force, obtained with the combination of a thermophilic serine protease and the Dimodan PH200 monoglycerides (with I2 value of about 15 g/100 g), is contained within the confidence interval of the theoretical value (additive effect), in particular that the actual reduction is above the lower limit of this confidence interval. This clearly demonstrates the absence of a synergistic effect on short bite for the combination of this monoglyceride preparation and the thermophilic protease.

Example 5: Soft Buns Prepared with Multec Mono MM 9202 spw and *Thermus aquaticus* Taq1 Protease (Comparative Example)

Soft buns were prepared according to the recipe and the process of example 2 using the ingredients combinations listed in Table 9. The ingredients used were the following:
Multec mono MM 9202 spw: distilled monoglycerides based on vegetable oil; iodine value (as I2) between 0 and 2 g/100 g; particle size: 30%<200 μm, 19%<150 μm (Puratos; Belgium);
TaProt as in example 1.

TABLE 9

|  | REF 3 | P | $M^C$ | $2M^C$ | $4M^C$ | $PM^C$ | $P2M^C$ | $P4M^C$ |
|---|---|---|---|---|---|---|---|---|
| TaProt (units) |  | 7 |  |  |  | 7 | 7 | 7 |
| MM 9202 spw (g) |  |  | 5 | 10 | 20 | 5 | 10 | 20 |

Short bite of the buns was evaluated with the same methods as in example 1.

Results for texture analysis are presented in Table 10

TABLE 10

|  | REF 3 | P | $M^C$ | $2M^C$ | $4M^C$ | $PM^C$ | $P2M^C$ | $P4M^C$ |
|---|---|---|---|---|---|---|---|---|
| Force Max (g) | 954 | 834 | 948 | 918 | 938 | 904 | 908 | 855 |
| Actual reduction of force compared to REF 3 | — | −120 | −6 | −36 | −16 | −50 | −46 | −99 |
| Theoretical reduction of force for combination | — | — | — | — | — | −126 | −156 | −136 |

The results show that the actual reduction of force, obtained with the combination of a thermophilic serine protease and the Multec mono MM 9202 spw monoglycerides (particle size: 30%<200 μm), is contained within the confidence interval of the theoretical value (additive effect), in particular that the actual reduction is above the lower limit of this confidence interval. This clearly demonstrates the absence of a synergistic effect on short bite for the combination of this monoglyceride preparation and the thermophilic protease.

Example 6: Soft Buns Prepared with Dimodan PH110 and *Thermus aquaticus* Taq1 Protease (Comparative Example)

Soft buns were prepared according to the recipe and the process of example 2 using the ingredients combinations listed in Table 11. The ingredients used were the following:

Dimodan PH110: distilled monoglycerides based on palm oil; iodine value (as I2) between approx. 30 and 40 g/100 g; particle size: 52%<200 μm, 40%<150 μm (DuPont Danisco);

TaProt as in example 1

TABLE 11

|  | REF 3 | P | $M^C$ | $2M^C$ | $4M^C$ | $PM^C$ | $P2M^C$ | $P4M^C$ |
|---|---|---|---|---|---|---|---|---|
| TaProt (units) |  | 7 |  |  |  | 7 | 7 | 7 |
| Dimodan PH110 (g) |  |  | 5 | 10 | 20 | 5 | 10 | 20 |

Short bite of the buns was evaluated with the same methods as in example 1.

Results for texture analysis are presented in Table 12

TABLE 12

|  | REF 3 | P | $M^C$ | $2M^C$ | $4M^C$ | $PM^C$ | $P2M^C$ | $P4M^C$ |
|---|---|---|---|---|---|---|---|---|
| Force Max (g) | 818 | 642 | 705 | 675 | 601 | 624 | 517 | 487 |
| Actual reduction of force compared to REF 3 | — | −176 | −113 | −143 | −217 | −194 | −301 | −331 |
| Theoretical reduction of force for combination | — | — | — | — | — | −289 | −319 | −393 |

The results show that the actual reduction of force, obtained with the combination of a thermophilic serine protease and the Dimodan PH110 monoglycerides, is contained within the confidence interval of the theoretical value (additive effect), in particular that the actual reduction is above the lower limit of this confidence interval. This clearly demonstrates the absence of a synergistic effect on short bite for the combination of this monoglyceride preparation and the thermophilic protease.

The invention claimed is:

1. A method for preparing a baked product, comprising the step of adding to a dough or batter, prior to baking:
   at least one first enzyme, wherein said first enzyme is a thermophilic serine protease having an optimum activity at a temperature higher than 70° C.;
   one or more monoglycerides in powder form; wherein said one or more monoglycerides are distilled monoglycerides from edible vegetable oil, having an iodine value between 0 g and 2 g/100 g, and wherein between 70% and 100% of the monoglycerides have a particle size of lower than 150 μm; and
   wherein said baked product shows improved short bite, wherein the reduction in the maximum force needed to break the baked product prepared using the combination of the at least one first enzyme and the one or more monoglycerides in powder form is greater than the sum of the reduction in the maximum force needed to break a baked product prepared with the at least one first enzyme, and the reduction in the maximum force needed to break a baked product prepared with the one or more monoglycerides in powder form, taken individually.

2. The method according to claim 1, wherein between 70% and 100% of the monoglycerides have a particle size of lower than 100 μm.

3. The method according to claim 1, wherein no adverse effects on dough rheology, on crumb structure and on loaf volume of the baked product are observed, wherein the baked product is prepared from a dough or batter comprising the at least one first enzyme and the one or more monoglycerides in powder form, wherein the baked product is compared to a reference baked product, and wherein the reference baked product is prepared with said first enzyme or wherein the reference baked product is a baked product prepared with said one or more monoglycerides alone.

4. The method according to claim 1, wherein said first enzyme is added in an amount of between 200 to 900 units/100 kg of flour.

5. The method according to claim 1, wherein said first enzyme is added in an amount of between 350 to 700 units/100 kg of flour.

6. The method according to claim 1, wherein said first enzyme is a thermophilic serine protease having an optimum activity at a temperature higher than 80° C.

7. The method according to claim 1, wherein said first enzyme is added in an amount of between 100 to 1200 units/100 kg of flour.

8. The method according to claim 1, wherein a maximum force needed to break the baked product, prepared using the at least one first enzyme and the one or more monoglycerides in powder form, is reduced by at least 15% compared to a reference baked product, wherein the reference baked product is prepared with said first enzyme alone or wherein the reference baked product is prepared with said one or more monoglycerides alone.

9. The method according to claim 2, wherein a maximum force needed to break the baked product, prepared using the at least one first enzyme and the one or more monoglycerides in powder form, is reduced by at least 15% compared to a reference baked product, wherein the reference baked product is prepared with said first enzyme alone or wherein the reference baked product is prepared with said one or more monoglycerides alone.

10. A baked product prepared from a dough or batter comprising a composition in powder form, said composition comprising at least one first enzyme, wherein said first enzyme is a thermophilic serine protease having an optimum activity at a temperature higher than 70° C.; and one or more monoglycerides, wherein said monoglycerides are distilled monoglycerides from edible vegetable oil, having an iodine value between 0 g and 2 g/100 g, and wherein between 70% and 100% of the monoglycerides have a particle size of lower than 150 μm,
    wherein said baked product shows improved short bite, wherein the reduction in the maximum force needed to break the baked product prepared using the combination of the at least one first enzyme and the one or more monoglycerides in powder form is greater than the sum of the reduction in the maximum force needed to break a baked product prepared with the at least one first enzyme and the reduction in the maximum force needed to break a baked product prepared with the one or more monoglycerides in powder form taken individually.

11. The baked product according to claim 10, wherein said first enzyme is a thermophilic serine protease having an optimum activity at a temperature of higher than 80° C.

12. The baked product according claim 10, wherein said first enzyme is a thermophilic serine protease, wherein the ratio between the protease activity at optimum temperature and the protease activity at 25° C. is higher than 15.

13. The baked product according to claim 10, wherein said first enzyme is a thermophilic serine protease selected from aqualysin I or aqualysin II from *Thermus aquaticus*.

14. The baked product according to claim 13, wherein said first enzyme is aqualysin I from *Thermus aquaticus* LMG8924.

15. The baked product according to claim 10, wherein at least 70% of said monoglycerides have a particle size of lower than 120 μm.

16. The baked product according to claim 10, wherein said first enzyme is a thermophilic serine protease wherein a ratio between the protease activity at a temperature for the optimum activity and the protease activity at 25° C. is higher than 10.

17. The baked product according to claim 10, wherein the baked product is a soft or crusty bakery product.

18. The baked product according to claim 17, wherein the baked product is selected from the group consisting of bread, soft roll, donut, bun, Danish pastry, croissant, hamburger roll, pizza, pita bread and cake, wherein the bun is optionally a microwavable bun.

19. The baked product according to claim 10, wherein between 70% and 100% of said monoglycerides have a particle size of lower than 100 μm.

20. The baked product according to claim 10, wherein a maximum force needed to break the baked product, prepared using the at least one first enzyme and the one or more monoglycerides in powder form, is reduced by at least 15% compared to a reference baked product, wherein the reference baked product is prepared with said first enzyme alone, or wherein the reference baked product is prepared with said one or more monoglycerides alone.

21. The baked product according to claim 19, wherein a maximum force needed to break the baked product, prepared using the at least one first enzyme and the one or more monoglycerides in powder form, is reduced by at least 15% compared to a reference baked product, wherein the reference baked product is prepared with said first enzyme alone, or wherein the reference baked product is prepared with said one or more monoglycerides alone.

\* \* \* \* \*